United States Patent [19]

Kaneda

[11] Patent Number: 5,491,562
[45] Date of Patent: Feb. 13, 1996

[54] METHOD OF COLOR DATA MAPPING IN COLOR VIDEO SIGNAL RECORDING TO VIDEO DISC

[75] Inventor: Isami Kaneda, Yokohama, Japan

[73] Assignee: Victor Company of Japan, Ltd., Yokohama, Japan

[21] Appl. No.: 243,085

[22] Filed: May 16, 1994

Related U.S. Application Data

[63] Continuation of Ser. No. 908,256, Jul. 6, 1992, abandoned.

[30] Foreign Application Priority Data

Jul. 5, 1991 [JP] Japan .................................. 3-192509

[51] Int. Cl.⁶ .............................. H04N 5/83; H04N 9/79
[52] U.S. Cl. ........................ 358/342; 358/310; 358/322
[58] Field of Search ..................................... 358/310, 342, 358/322, 517, 518; 348/488, 661

[56] References Cited

U.S. PATENT DOCUMENTS

| | | | |
|---|---|---|---|
| 4,727,425 | 2/1988 | Mayne et al. ........................... | 340/703 |
| 5,122,784 | 6/1992 | Canova ................................... | 340/703 |
| 5,130,701 | 7/1992 | White et al. ........................... | 358/703 |
| 5,138,303 | 8/1992 | Rupel ..................................... | 340/703 |

*Primary Examiner*—Tommy P. Chin
*Assistant Examiner*—Huy Nguyen
*Attorney, Agent, or Firm*—Jacobson, Price, Holman & Stern

[57] ABSTRACT

A method of color data mapping in color video signal recording to a video disc. A predetermined different number of color data are mapped onto first and second color maps respectively. Each data is expressed by color gradation in different format between the maps. The format of the gradation in the first map is converted into the format of the gradation in the second map. A difference is taken between the gradation of the colors in the same format between the maps. The difference is then compared with a reference quantity. The color in the first map is judged as to whether it is the same as or close to the color in the second map in color solid if the difference is smaller than the reference quantity. The color data are then mapped onto a third color map onto which no color data is mapped, if the judgment is made.

4 Claims, 4 Drawing Sheets

METHOD OF COLOR DATA MAPPING IN COLOR VIDEO SIGNAL RECORDING TO VIDEO DISC

This is a continuation of application Ser. No. 07/908,256, filed Jul. 6, 1992 which was abandoned upon the filing hereof.

BACKGROUND OF THE INVENTION

This invention relates to color data processing in recording color video signals to an image recording medium such as a video disc. More particularly, this invention relates to a method of color data mapping for recording color images onto a compact disc with extended graphic format (hereinafter abbreviated as CD-EG).

In Compact Disc specifications, a format of Compact Disc Graphic (hereinafter abbreviated as CD-G) is specified for displaying additional image information with digital sound. Since recording areas available for this purpose are limited, at most 16 colors selected from 4096 colors indicated with $RGB_{444}$, as shown in FIG. 1A, are available. The $RGB_{444}$ expresses colors compounded with three primary colors, i.e. R (red), G (green) and B (blue), respectively having a gradation expressed by 4 bits.

For recording a color image in a CD-G disc, these 16 colors for suitably expressing the color image are selected first from above-mentioned 4096 colors and recorded onto the disc as the information of a color look-up table (CLUT) in disc reproduction. In this case, the recording order of these 16 colors indicates the color number of them. Next, all pixels in the color image are converted into the respective color numbers and these numbers are recorded onto the disc a pixel data.

In disc reproduction, a CD-G player reads out these 16 colors and generates the CLUT, read out the pixel data, decodes the color number of each pixel and successively outputs a set of 3 primary color data by referring to the CLUT.

Recently, for more detailed image reproduction, the CD-EG format have been proposed. In this format, 256 colors selected from 262144 colors indicated with $RGB_{666}$, as shown in FIG. 1B, are available. As the result, the pixel data appointing respective color numbers in the CLUT are expressed with 8 bits and these data are divided into two groups, one represents upper 4 bits, another represents lower 4 bits, and recorded onto the disc respectively.

Unfortunately, CD-G players only acknowledge top 16 color from 256 colors in the CLUT of the CD-EG and the lower 4 bits group from the pixel data of the CD-EG disc. Therefore, when these players reproduce the CD-EG disc of which the colors of the CLUT are freely selected, a poor color image may be reproduced. Therefore, it is desirable to select and to map above-mentioned 256 colors of the CD-EG in consideration for reproduction in CD-G systems.

As described above, on a recorded disc, each of the pixel data in the color image is expressed by one of the numbers corresponding with the colors in the CLUT.

That number is called a pixel value hereinafter. Furthermore, combinations of pixel values constituting a color image are called pixel data and the color look-up table (CLUT) called a color map hereinafter. For example, the color look-up table of the CD-G is expressed as the color map $C_{16}$.

As stated above, at most 16 colors are selected from the $RGB_{444}$ in the CD-G. Pixel values which express those 16 colors can be indicated in 4 bit-format because $16=2^4$. In the case of the CD-EG, at most 256 colors are selected from the $RGB_{666}$. Pixel values which express those 256 colors can be indicated in 8 bit-format because $256=2^8$.

FIG. 2 Shows a relationship between colors and their gradations selected in the CD-G and the CD-EG. In the CD-G, there are 0 to 15 pixel values in decimal notation because at most 16 colors are used, the gradation of which are expressed in 4 bit-format. The area indicated by arrow marks FA and FB in FIG. 2 is thus interpreted in a color map for displaying a color image by the 16 colors at most.

On the contrary in the CD-EG, there are 0 to 255 pixel values in decimal notation because at most 256 colors are used, the gradation of which are expressed in 6 bit-format. The whole area in FIG. 2 is thus interpreted in a color map for displaying a color image by the 256 colors at most.

In the case of the CD-EG, two memory planes as a random access memory for holding pixel values are used in a CD-EG player which produces 256 colors. That is, as shown in FIG. 3A, pixel data of a color image in the CD-EG includes pixel values each expressed by 8 bits which include the lower 4 bits the format thereof being the same as that for the CD-G and the upper 4 bits. The pixel data is thus sent to a display apparatus with this format.

When a video signal based on such a format is reproduced by a CD-G player, those lower 4 bits are interpreted and then a color image is displayed. That is, for example pixel values "0" and "16" in decimal notation are expressed "00000000" and "00010000" in binary notation, respectively. The lower 4 bits are the same, so that the both are interpreted as a pixel value "0000" by the CD-G player.

Therefore, an image stored in the CD-EG can be vividly reproduced by the CD-G player, which produces at most 16 colors, only if colors of pixel values whose lower 4 bits are the same as each other are the same colors among the 256 colors in the CD-EG. For example, if colors whose pixel values "0", "16", "32", ..., in the color map of the CD-EG are the same colors, an image stored in the CD-EG can be vividly reproduced by the CD-G player. It is thus can be said that if colors are aligned by a cycle of a pixel value "16" in the CD-EG, an image stored in the CD-EG can be vividly reproduced by the CD-G player.

Gradation of a color is cut from 6 bits to 4 bits by the method mentioned above. This is shown in FIG. 3B where the upper 4 bits of 6 bits of color gradation in the CD-EG becomes color gradation in the CD-G.

The above explanation focuses on the pixel value. However, if the color gradation is focussed on, an image stored in the CD-EG can be vividly reproduced by the CD-G player if colors of pixel values where the upper 4 bits of the gradation is the same are the same color.

The following process is carried out in signal recording process to the CD-EG in order that color images recorded in the CD-EG might be reproduced by the CD-G player.

To express gradation of R, G, and B of dots constituting a color image to be recorded in 4 bit-format in binary notation to detect colors used for the image;

To select at most 16 colors suitable for displaying the image from the detected colors to compose a color map $C_{16}$ by numbering those 16 colors with color numbers; and To compose a pixel data table in which colors of the dots of the image are numbered the color numbers.

The following process is also carried out parallel to the above process.

To express gradation of R, G, and B of dots constituting a color image to be recorded in 6 bit-format in binary notation to detect colors used for the image;

To select at most 256 colors suitable for displaying the image from the detected colors;

To compose a histogram showing the frequency of use of the selected at most 256 colors;

To sort these selected colors according to the histogram and to number the selected colors with color numbers in order of the frequency of use to compose a color map $C_{256}$; and To compose a pixel data table in which colors of the dots of the image are numbered the color numbers.

Then, as shown in FIG. 4, a new color map Ccomp of 256 colors is composed by operating the color map $C_{16}$ of 16 colors in the $RGB_{444}$ for the CD-G and the color map $C_{256}$ of 256 colors in the $RGB_{666}$ for the CD-EG. The color map Ccomp is then recorded to the CD-EG with signals such as audio signals.

There are some conceivable methods for composing the color map Ccomp. One method is to map 256 colors of the color map $C_{256}$ onto the color map Ccomp according to the gradation of each of the 256 colors being close to the gradation of a color among 16 colors of the color map $C_{16}$ in color solid defined by three orthogonal co-ordinates (i.e. R, G and B axes). This method is called LEVEL I hereinafter. The 256 colors of the color map $C_{256}$ are mapped onto the color map Ccomp in order of closeness in the color solid of the 256 colors to the 16 colors of the color map $C_{16}$ in spite of that how many bits in binary notation of the gradation of the 256 colors are different from the gradation of the 16 colors expressed in 4 bit-format.

Another method for composing the color map Ccomp is to map colors among the 256 colors of the color map $C_{256}$ onto the color map Ccomp according to the histogram. The colors to be mapped among the 256 colors are the colors whose upper 4 bits of 6 bits in gradation are equal to 4 bits in gradation of the 16 colors of the color map $C_{16}$ and whose lower 2 bits of 6 bits in gradation are close to the 4 bits in gradation of the 16 colors in the color solid.

This method is called LEVEL III hereinafter. In LEVEL III, if there are colors more than 16 colors, among the 256 colors of the color map $C_{256}$, whose upper 4 bits in gradation are the same as the 4 bits in gradation of a color of the color map $C_{16}$ and whose lower 2 bits in gradation are different from each other, those colors are ignored.

The above-mentioned methods have disadvantages. First in LEVEL I, all the colors of the color map $C_{256}$ are mapped onto the color map Ccomp, so that colors of the map $C_{256}$ distant from the 16 colors of the map $C_{16}$ in the color solid are also selected. This results in a poor color image if reproduced by the CD-G player.

Secondary in LEVEL III, the number of colors selected from the color map $C_{256}$ to the color map Ccomp decreases very much because of ignored colors, so that this results in also a poor color image if reproduced by the CD-G player.

Furthermore in LEVEL III, the judgment is made as to whether the 4 bits in gradation of a color of the color map $C_{16}$ is equal to the upper 4 bits of the 6 bits in gradation of a color of the color map $C_{256}$. This results in a poor color image with lower average intensity corresponding to the number of colors of the color map $C_{256}$ whose upper 4 bits are equal to the 4 bits of colors of the color map $C_{16}$.

SUMMARY OF TEE INVENTION

It is therefore an object to the present invention to provide a method of color data mapping in color video signal recording to a video disc such as the CD-EG for displaying a vivid color image even if reproduced from the CD-EG by the CD-G player.

According to the present invention, a method of color data mapping in color video signal recording to a video disc, the method comprises the steps of: preparing first and second color maps onto which a predetermined number of color data are mapped, each data being expressed by color gradation in different format between the maps; converting the format of the gradation in the first map into the format of the gradation in the second map; taking a difference between the gradation of the colors in the same format between the maps; comparing the difference with a reference quantity; judging as to whether the color in the first map the same as or close to the color in the second map in color solid if the difference is smaller than the reference quantity; preparing a third color map onto which no color data is mapped; and mapping the color data onto the third map if the judgment is made.

A method of color data mapping in color video signal recording to a video disc, the method further comprises the steps of: preparing a first color map onto which 256 color gradation data in 6 bit-format by binary notation are mapped and a second color map onto which 16 color gradation data in 4 bit-format by binary notation are mapped, each data being composed of gradation of primary colors red, green and blue; converting the 6 bit-format of the gradation in the first map into the 4 bit-format of the gradation in the second map by rounding off 2 lower bits of the 6 bit-format; taking a difference between the gradation of each of the primary colors between the maps in the 4 bit-format; squaring the difference in each of the primary colors; adding the squared difference in each of the primary colors to each other; comparing the addition result with a reference quantity; judging as to whether the color in the first map the same as or close to the color in the second map in color solid if the addition result is smaller than the reference quantity; preparing a third color map onto which no color data is mapped; and mapping the color in the first map onto the third map if the judgment is made.

DESCRIPTION OF THE PREFERRED EMBODIMENTS

A preferred embodiment of the present invention is explained with reference to the drawings attached herewith.

In this embodiment, color maps $C_{16}(n)$, (n=0, . . . , 15) and $C_{256}(m)$, (m=0, . . . , 255) are composed in the same way as that already disclosed above.

A color map Ccomp(m), (m=0, . . . , 255) is composed in a way as disclosed below in two STEPS A and B.

First in STEP A, each of color of the color maps $C_{16}(n)$ are mapped onto the upper 4 bits of 6 bits in gradation of the color map Ccomp(m) by a 16-cycle in such a way that Ccomp(0)=Ccomp(16)=Ccomp (32) . . . =Ccomp(240)= $C_{16}(0)$.

Figure 1A:
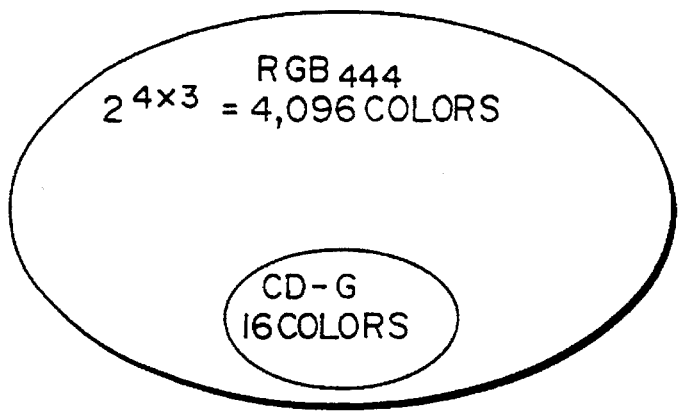
FIG. 1A is a view showing a color set of the CD-G.
Figure 1B:
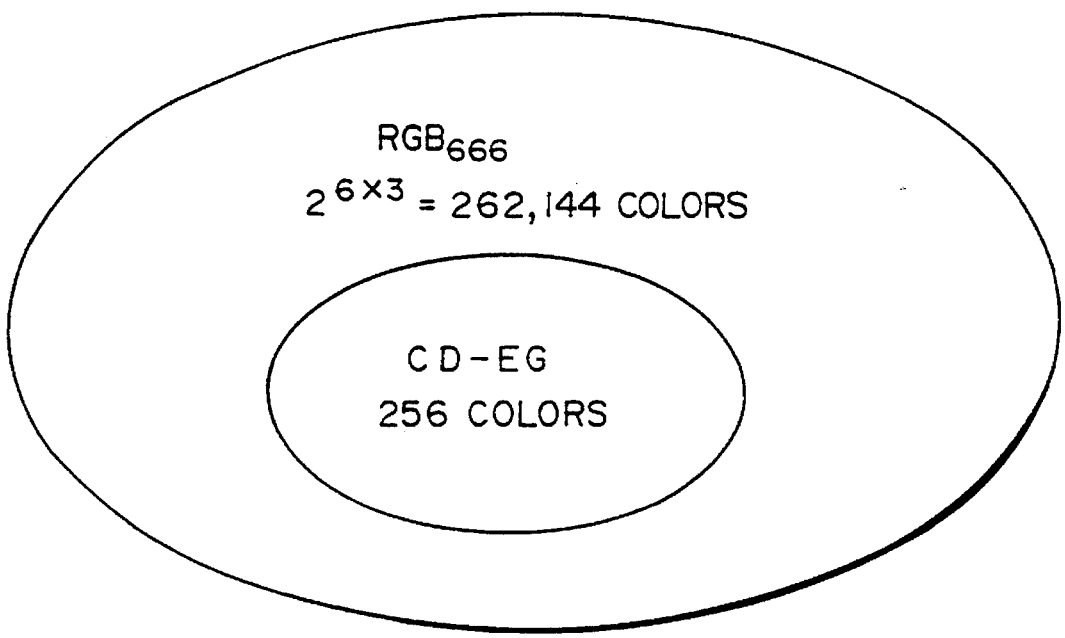
FIG. 1B is a view showing a color set of the CD-EG.
Figure 2:
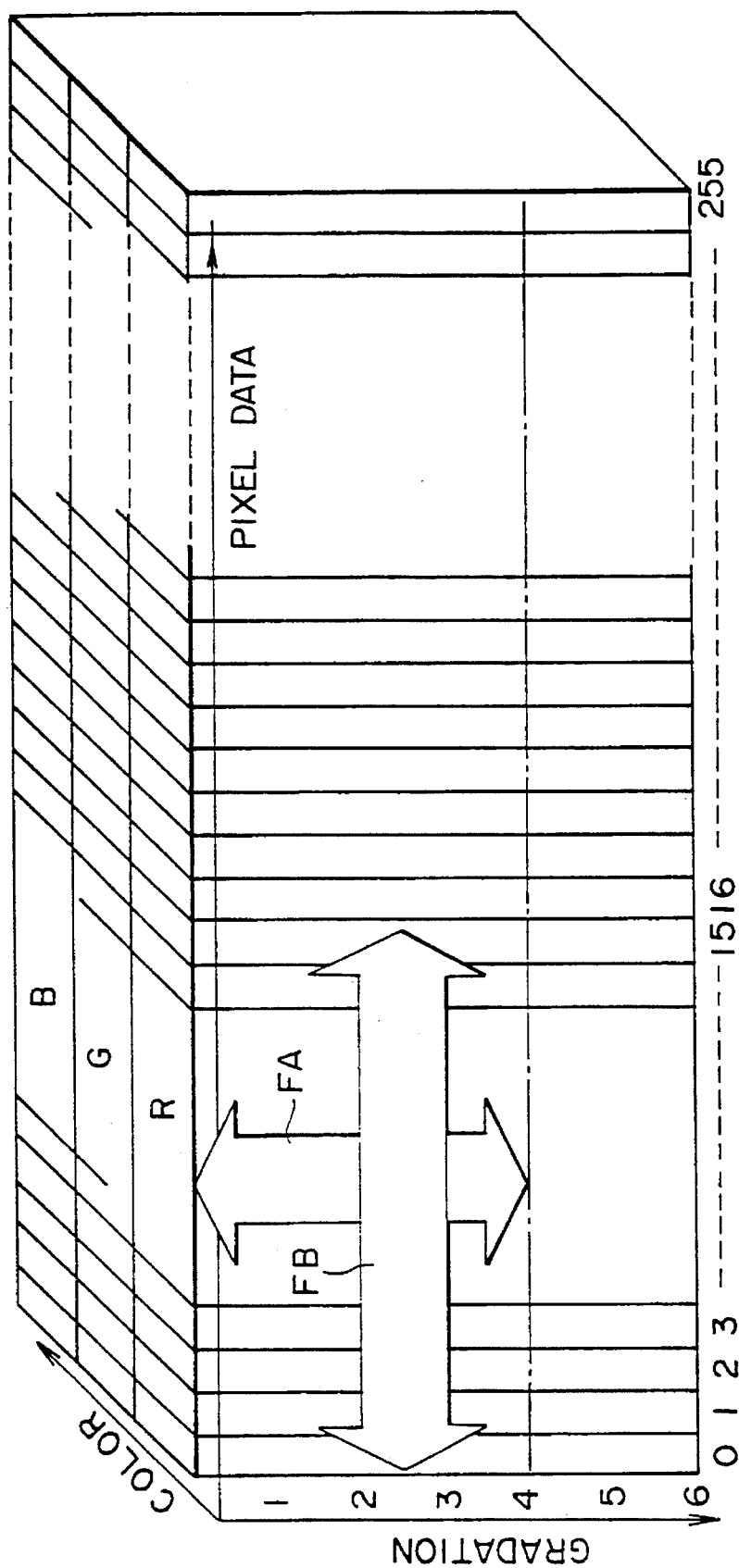
FIG. 2 is a view showing the relationship between gradation and pixel data of colors of the CD-G and CD-EG.
Figure 3A:
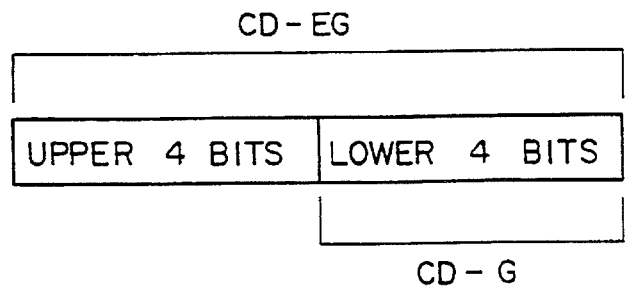
FIG. 3A is a view showing formats of the pixel data of the CD-G and CD-EG.
Figure 3B:
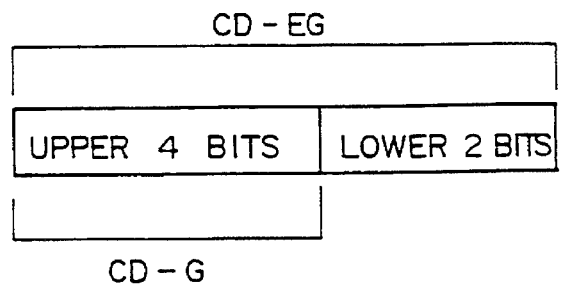
FIG. 3B is a view showing formats of the gradation of the CD-G and CD-EG.
Figure 4:
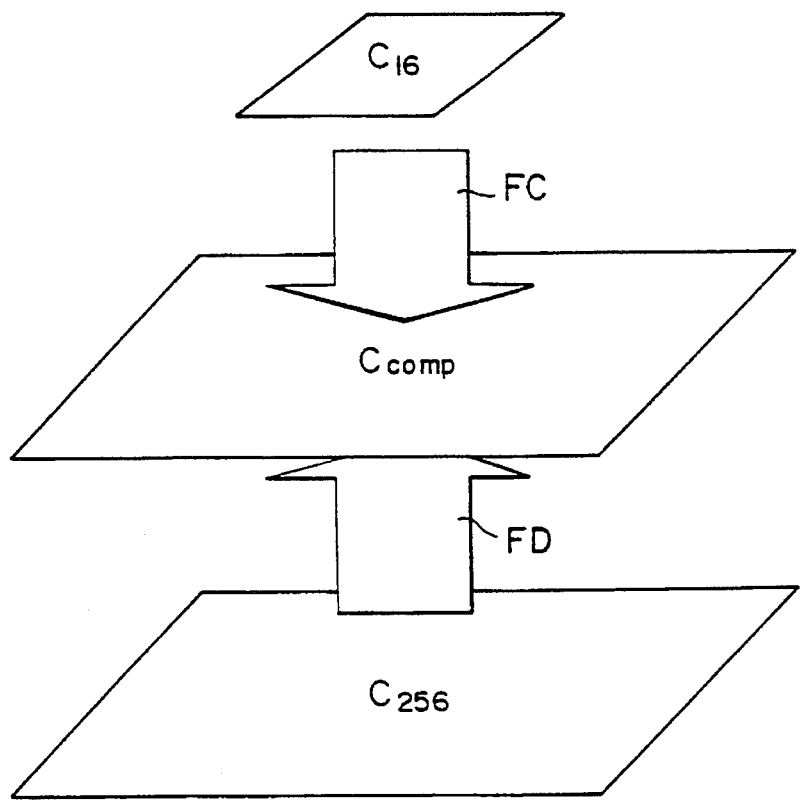
FIG. 4 is a view showing the relationship between the color maps $C_{16}$ and $C_{256}$ and the color map Ccomp.

More specifically, the mapping onto the color map Ccomp(m) is carried out with the following condition (1):

$$R_{comp}(0)=R_{comp}(16)=R_{comp}(32)=\ldots=R_{comp}(240)=(R_{16}(0)<<2)$$
$$G_{comp}(0)=G_{comp}(16)=G_{comp}(32)=\ldots=G_{comp}(240)=(G_{16}(0)<<2)$$
$$B_{comp}(0)=B_{comp}(16)=B_{comp}(32)=\ldots=B_{comp}(240)=(B_{16}(0)<<2)$$
...
$$R_{comp}(15)=R_{comp}(31)=R_{comp}(47)=\ldots=R_{comp}(255)=(R_{16}(15)<<2)$$
$$G_{comp}(15)=G_{comp}(31)=G_{comp}(47)=\ldots=G_{comp}(255)=(G_{16}(15)<<2)$$
$$B_{comp}(15)=B_{comp}(31)=B_{comp}(47)=\ldots=B_{comp}(255)=(B_{16}(15)<<2)$$
... (1)

where gradation of color elements R, G and B of the 16 colors of the color map $C_{16}(n)$ are $R_{16}(n)$, $G_{16}(n)$ and $B_{16}(n)$ and those of the color map Ccomp(m) are Rcomp(m), Gcomp(m) and Bcomp(m). This shows the mapping indicated by an arrow mark FC in the FIG. 4.

In the above condition (1), the sign << indicates 2 bits "00" are attached as the lower 2 bits to the 4 bits, for example, of $R_{16}(0)$.

Furthermore in the condition (1), suppose that the gradation of $R_{16}(0)$, $G_{16}(0)$ and $B_{16}(0)$ are R=1111, G=1111, and B=0000, the gradation of color elements R, G and B of Ccomp(0), Ccomp(16), Ccomp(32), . . . , Ccomp(240) are R=1111xx, G=1111xx and B=0000xx respectively, where the lower 2 bits "xx" are unidentified.

Next in STEP B, colors of the color map $C_{256}(m)$ which are close to a color of the color map $C_{16}(n)$ in the color solid are mapped onto the Ccomp(m). This shows the mapping indicated by an arrow mark FD.

First in STEP B, colors among the 256 colors of the color map $C_{256}$ which are at most close to the 16 colors of the color map $C_{16}$ in the color solid are detected. These detected colors are mapped onto Ccomp(0) to Ccomp(15) respectively.

Following Ccomp(15), the lower 2 bits of the 6 bits in gradation of the color elements R, G and B of the color map 256 are rounded off so that the 6 bits are converted into 4 bits. These converted gradation of R, G and B are indicated with $R_{256-4}$, $G_{256-4}$ and $B_{256-4}$.

Squaring and addition are carried out between these $R_{256-4}$, $G_{256-4}$, and $B_{256-4}$ and color elements $R_{16}$, $G_{16}$ and $B_{16}$ of the color map $C_{16}$ as follows:

$$Rdiff=R_{16}-R_{256-4}$$

$$Gdiff=G_{16}-G_{256-4}$$

$$Bdiff=B_{16}-B_{256-4}$$

$$Rdiff^2+Gdiff^2+Bdiff^2<3 \quad (2)$$

The colors of the color map $C_{256}$ which satisfy the condition (2) are mapped onto Ccomp(m) following the Ccomp(15).

For example, suppose that the gradation of R, G and B of the color map $C_{16}$ are $R_{16}$=1100, $G_{16}$=1001 and $B_{16}$=0101 and those of the color map $C_{256}$ are $R_{256}$=110001, $G_{256}$= 101000 and $B_{256}$=010110, rounding off of the lower 2 bits of $R_{256}$, $G_{256}$ and $B_{256}$ produces $R_{256-4}$=1100, $G_{256-4}$=1010 and $B_{256-4}$=0110.

According to the condition (2), $(1100-1100)^2+(1001-1010)^2+(0101-0110)^2=2 <3$, so that $R_{256}$=110001, $G_{256}$= 101000 and $B_{256}$=010110 can be mapped onto the Ccomp(m).

Therefore, if there is about 1 bit difference between the 4 bit-format gradation of R, G and B of a color of the color mat $c_{16}$ and the results of rounding off the lower 2 bits of the 6 bit-format gradation of any two of R, G and B of colors of the color map $C_{256}$, those colors are mapped onto the Color map Ccomp in order of closeness in the color solid of the colors of the color map $C_{256}$ to the color of the color map $C_{16}$.

Figure 5:
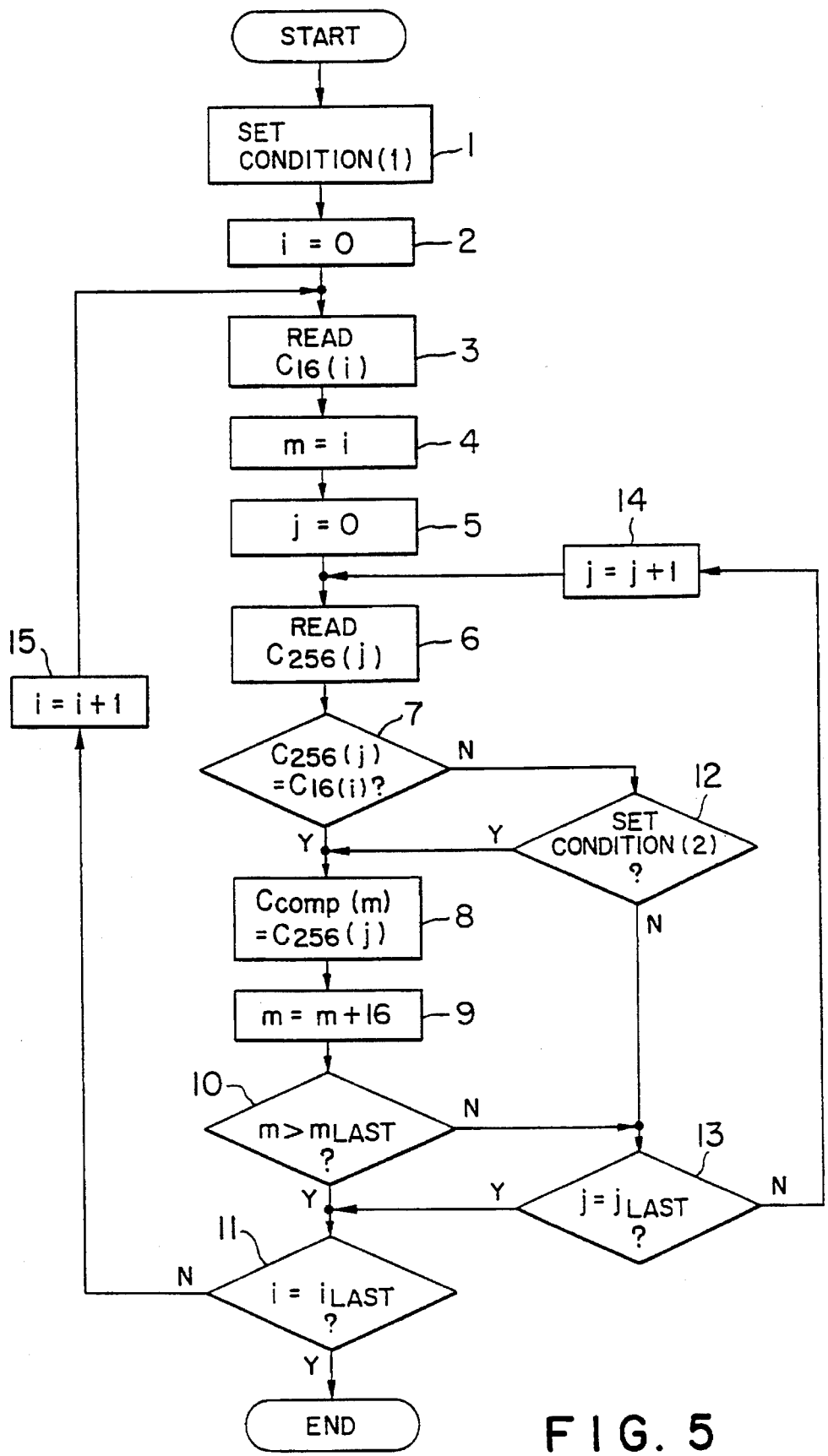
FIG. 5 is a flowchart for explaining the method of color data mapping according to the present invention.

The above method is further explained with the flowchart shown in FIG. 5.

In FIG. 5, the condition (1) is set and all the upper 4 bits of 6 bits in gradation of the color map Ccomp(m) are made the same each other by a 16-cycle according to the condition (1) in Step 1.

Then, an index "i" (smaller than "16") is set "0" in Step 2, where the index "i" indicates which number of 16 colors in the color map $C_{16}$ is processed . Next, the color map $C_{16}$ is read in Step 3.

An index "m" (smaller than "256") is set "i" in Step 4, where the index "m" m indicates an element of the color map Ccomp. An index "j" (smaller than "256") is set "0" in Step 5, where the index "j" indicates which number of 256 colors in the color map $C_{256}$ is processed and then the color map $C_{256}$ is read in Step 6.

Next in Step 7, comparison is made in gradation between the colors of the color maps $C_{16}(i)$ and $C_{256}(j)$ with respect to R, G and B.

If the color maps $C_{16}(i)$ and $C_{256}(j)$ are equal to each other in the comparison, the process moves on to Step 8, while if not equal, the process moves on to Step 12.

In Step 12, the condition (2) is set and it is judged as to whether the condition (2) is satisfied with respect to $C_{256}(j)$ and $C_{16}(i)$. If it is satisfied, the process moves on to Step 8, while not satisfied, the process moves on to Step 13.

In Step 13, the index "j" of the color map $C_{256}$ is verified as to whether it is the last index "$J_{LAST}$". If not the last index, the process moves on to Step 14 where the index "j" is replaced with "j+" and then the process returns to Step 6. If the last index, the process moves on to Step 11.

In Step 8, $C_{256}(j)$ is substituted for Ccomp(m) and the process moves on to Step 9 where the index "m" is replaced with "m+1".

Next in Step 10, the index "m" of the color map Ccomp is verified as to whether it is greater than the last index "$m_{LAST}$". If the result in Step 10 is negative, the process moves on to Step 13.

If the result in Step 10 is positive, the process moves on to Step 11 where the index "i" of the color map $C_{16}$ is verified as to whether it is the last index "$i_{LAST}$". In Step 11, if not the last index, the process moves on to Step 15 where index "i" is replaced with "i+1" and the process returns to Step 3.

If the last index in Step 11, the process is completed.

As disclosed above, the color map Ccomp can be composed. However there are colors which are ignored in Step 7, so that the color map Ccomp composed at this stage has not all colors mapped onto 0 to 255 color numbers from the color map $C_{256}$.

Accordingly, there are further steps as follows:

Firstly, color numbers of those ignored colors are detected. Then, pixel data corresponding to the ignored colors are read out from the pixel data table of the color map $C_{256}$.

Next, colors which are close to the ignored colors in the color solid are searched through the color map Ccomp composed as above. Pixel values of the pixel data of the ignored colors are replaced with the color numbers of the colors searched through the color map Ccomp and are written into the pixel data table of the color map $C_{256}$.

The pixel data table of the color map $C_{256}$ having pixel data replaced as above then becomes a pixel data table of the color map Ccomp.

Then, the color map Ccomp and its pixel data table are stored in the CD-EG with other signals such as audio signals for reproducing color images vividly by both the CD-G and CD-EG players.

The color data mapping method disclosed above is called LEVEL II hereinafter.

TABLE 1 shows the results of color mapping to color image samples S1 to S11 by LEVEL II and LEVELS I and III already mentioned. The number of colors constituting the color image samples S1 to S11 depend on each image sample.

$$Rdiff^2 + Gdiff^2 + Bdiff^2 < 2 \quad (4)$$

where "diff$^2$" indicates the same meaning as mentioned in the condition (2).

In Step 12, where the condition (3) is set and the process moves on to Step 8 to detect colors which satisfy the condition (3). That is, if the 4 bit-format gradation of R, G and B of a color of the color map $C_{16}$ is equal to the results of rounding off the lower 2 bits of the 6 bit-format gradation of R, G and B of colors of the color map $C_{256}$, those colors of the map $C_{256}$ are judged close to the color of the map $C_{16}$ in the color solid. Then, those colors are primarily mapped onto the color map Ccomp.

When in Step 12, the condition (3) is dissatisfied the condition (4) is set and the process moves on to Step 8 to detect colors which satisfy the condition (4). That is, if there is about 1 bit difference between the 4 bit-format gradation

TABLE 1

| COLOR | NUMBER OF COLORS IN 6 BIT GRADATION | | NUMBER OF COLORS IN 4 BIT GRADATION | | LEVEL I | | LEVEL II | | LEVEL III | |
|---|---|---|---|---|---|---|---|---|---|---|
| IMAGE SAMPLE | DETECTED NUMBER | SELECTED NUMBER | DETECTED NUMBER | SELECTED NUMBER | CD-EG | CD-G | CD-EG | CD-G | CD-EG | CD-G |
| S1 | 6064 | 249 | 265 | 16 | 249 | 14 | 188 | 15 | 64 | 12 |
| S2 | 2015 | 248 | 525 | 15 | 248 | 14 | 141 | 15 | 42 | 15 |
| S3 | 6041 | 249 | 449 | 15 | 249 | 15 | 169 | 13 | 76 | 13 |
| S4 | 6307 | 253 | 432 | 16 | 253 | 15 | 169 | 16 | 73 | 16 |
| S5 | 4265 | 253 | 940 | 16 | 253 | 15 | 129 | 15 | 35 | 14 |
| S6 | 12368 | 252 | 833 | 16 | 252 | 16 | 129 | 16 | 34 | 16 |
| S7 | 612 | 252 | 175 | 14 | 252 | 15 | 159 | 13 | 79 | 10 |
| S8 | 3767 | 241 | 262 | 16 | 241 | 12 | 169 | 14 | 67 | 13 |
| S9 | 4318 | 247 | 194 | 16 | 247 | 15 | 165 | 15 | 87 | 14 |
| S10 | 2489 | 238 | 185 | 15 | 236 | 9 | 177 | 13 | 91 | 11 |
| S11 | 5350 | 238 | 321 | 16 | 238 | 14 | 153 | 14 | 65 | 14 |

In TABLE 1, the number of colors detected, for example, from an image sample S1 where gradation is indicated in 6 bit-format is 6064 and the number of colors selected from the 6064 colors for the color map $C_{256}$ is 249.

For the same image sample S1, the number of detected colors in the case where gradation is indicated in 4 bit-format is 265 and the number of colors selected from the 265 colors for the color map $C_{16}$ is 16.

The results of color mapping for the color image sample S1 using these color maps $C_{16}$ of 16 colors and $C_{256}$ of 249 colors are as follows:

First in LEVEL I, the number of colors selected from the color map $C_{256}$ to the color map Ccomp is 249, but that from the color map $C_{16}$ is 14. This means that the colors of the color map $C_{16}$ cannot be reproduced well.

Next in LEVEL III, the number of colors selected from color map $C_{16}$ to the color map Ccomp is 12, but that from the color map $C_{256}$ is 64. The number of colors selected from the color map $C_{256}$ also for other samples S2 to S11 is 91 in maximum and 34 in minimum. This means that the colors of the color map $C_{256}$ cannot be reproduced well.

Compared to LEVELS I and III, in LEVEL II, the number of colors selected from the color map $C_{256}$ through the samples S1 to S11 is 188 in maximum and 129 in minimum. This mean that vivid color images can be reproduced from the CD-EG even if reproduced by the CD-G player.

Another preferred embodiment of color data mapping method according to the present invention will be explained.

STEP A in this method is the same as using the condition (1) already disclosed. In STEP B, the following conditions are set besides the condition (2) in Step 12 in the flowchart shown in FIG. 5.

$$Rdiff^2 + Gdiff^2 + Bdiff^2 < 1 \quad (3)$$

of R, G and B of a color of the color map $C_{16}$ and the results of rounding off the lower 2 bits of the 6 bit-format gradation of any one of R, G and B of colors of the color map $C_{256}$, those colors of the map $C_{256}$ are judged close to the color of the map $C_{16}$ in the color solid. Then, those colors are secondarily mapped onto the color map Ccomp.

Other Steps required for this preferred embodiment are the same as those disclosed in the first embodiment with reference to FIG. 5. Thus, the description of those Steps are omitted.

The digits "3", "1" and "2" in the conditions (2), (3) and (4) respectively are determined based on experiments for reproducing vivid color images.

The color data mapping method according to the present invention can be carried out by a conventional apparatus for generating color data for video discs. The description of such an apparatus is thus omitted.

It is to be understood that the present invention is not limited to the embodiments disclosed above. For example, at most 16 and 256 colors are used by the CD-G and CD-EG respectively for displaying a color image, but colors more than those numbers can be used.

What is claimed is:

1. A method of color data mapping in recording a color video signal to a video disc, the method comprising the steps of:

preparing a first color map onto which a predetermined number of first color data are previously mapped and a second color map onto which second color data are previously mapped, the number of the second color data being less than the number of first color data, the first and second color data being expressed by color gradation in different formats;

converting the color gradation format of the first color data into the color gradation format of the second color data by rounding off a quantity of the first color data;

determining differences in the gradation between the second color data and the first color data which is converted into the format of the second color data;

comparing the differences with a reference quantity;

determining similarities in the color gradation of the first color data which is converted to the format of the second color data to the color gradation of the second color data if the differences are smaller than the reference quantity;

preparing a third color map onto which no color data is mapped; and mapping the first color data onto the third map in order of the determined similarities.

2. A method of color data mapping in recording a color video signal to a video disc, the method comprising the steps of:

preparing a first color map onto which 256 first color gradation data in 6 bit-format by binary notation are previously mapped and a second color map onto which 16 second color gradation data in 4 bit-format by binary notation are previously mapped, the first and second color gradation data being composed of gradations of primary colors red, green and blue;

converting the 6 bit-format of the first color gradation data into the 4 bit-format of the second color gradation data by rounding off 2 lower bits of the 6 bit-format;

determining differences between the first color gradation data which is converted to the 4 bit-format and the second color gradation data of each of the primary colors in the 4 bit-format;

squaring the differences in each of the primary colors;

adding the squared differences in each of the primary colors to each other;

comparing the result of the adding step with a reference quantity;

determining similarities in the first color gradation data which is converted to the 4 bit-format to the second color gradation data if the result of the adding step is less than the reference quantity;

preparing a third color map onto which no color data is mapped; and mapping the first color gradation data onto the third map in the order of the determined similarities.

3. A method of color data mapping according to claim 2, wherein the comparing step comprises the step of comparing the addition result with a digit 3.

4. A method of color data mapping according to claim 2, wherein the comparing step and determining step comprises the steps of:

comparing the addition result with a digit 1;

determining similarities in the first color gradation data which is converted to the 4 bit-format to the second color gradation data if the addition results are less than the digit 1;

comparing the addition result with a digit 2 when the addition result is equal to the digit 1 or more;

determining similarities in the first color gradation data which is converted to the 4 bit-format to the second color gradation data if the addition results are less than the digit 2;

comparing the addition result with a digit 3 when the addition result is equal to the digit 2 or more;

determining similarities in the first color gradation data which is converted to the 4 bit-format to the second color gradation data if the addition results are less than the digit 3.

* * * * *